United States Patent
Singhvi et al.

(10) Patent No.: US 10,432,697 B2
(45) Date of Patent: Oct. 1, 2019

(54) METHOD AND SYSTEM FOR RE-DEPLOYING METADATA AND ASSOCIATED DATA FROM A SOURCE ORGANIZATION TO A DESTINATION ORGANIZATION

(71) Applicant: salesforce.com, inc., San Francisco, CA (US)

(72) Inventors: Sameer Singhvi, Fremont, CA (US); Michael DeBlase, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 290 days.

(21) Appl. No.: 15/219,761

(22) Filed: Jul. 26, 2016

(65) Prior Publication Data

US 2018/0034890 A1 Feb. 1, 2018

(51) Int. Cl.
| | | |
|---|---|---|
| *H04L 29/08* | (2006.01) | |
| *G06F 3/0482* | (2013.01) | |
| *G06F 16/13* | (2019.01) | |
| *G06F 16/16* | (2019.01) | |
| *G06F 16/182* | (2019.01) | |

(52) U.S. Cl.
CPC ............. *H04L 67/06* (2013.01); *G06F 16/13* (2019.01); *G06F 16/164* (2019.01); *G06F 16/183* (2019.01)

(58) Field of Classification Search
CPC ............... H04L 67/06; G06F 17/30091; G06F 17/3012; G06F 17/30203; G06F 3/0482
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |

(Continued)

OTHER PUBLICATIONS

"Understanding Multitenancy and the Architecture of the Salesforce Platform", retrieved on Jan. 9, 2019 from https://www.slideshare.net/developerforce/understanding-multitenancy-and-the-architecture-of-the-salesforce-platform, published on Dec. 18, 2013 (Year: 2013).*

(Continued)

*Primary Examiner* — Shourjo Dasgupta
(74) *Attorney, Agent, or Firm* — Lorenz & Kopf, LLP

(57) ABSTRACT

Methods and systems are provided for re-deploying metadata and it's associated data from a source organization to a destination organization of a cloud-based computing environment. After metadata that is to be retrieved from the source organization is selected, a metadata engine can automatically create a manifest file that comprises the selected metadata that is to be retrieved. The manifest file can then be stored at secure file storage for re-deployment. A data engine can then automatically retrieve data associated with the selected metadata based, for example, on objects specified in the selected metadata. This data can be automatically saved and stored at a secured database for re-deployment. Thereafter, both the manifest file and the data associated with the selected metadata can be re-deployed to the destination organization.

14 Claims, 12 Drawing Sheets

(56) References Cited

U.S. PATENT DOCUMENTS

| | | |
|---|---|---|
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,779,475 B2 | 8/2010 | Jakobson et al. |
| 7,827,150 B1 * | 11/2010 | Wu .................. G06F 17/3012 |
| | | 707/671 |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,165,993 B2 * | 4/2012 | Broda ................. G06F 17/3056 |
| | | 707/634 |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,566,648 B2 * | 10/2013 | Schroeder .......... G06F 11/3672 |
| | | 714/38.14 |
| 8,566,792 B2 * | 10/2013 | Chasman ............ G06F 11/3604 |
| | | 707/999.004 |
| 8,646,103 B2 | 2/2014 | Jakobson et al. |
| 9,280,339 B1 * | 3/2016 | Prunicki .................. G06F 8/65 |
| 9,647,922 B2 * | 5/2017 | Mortimore, Jr. .... H04L 41/5051 |
| 9,736,121 B2 * | 8/2017 | Mraz .................. H04L 63/0428 |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0002989 A1 * | 1/2004 | Kaminer .......... G06F 17/30893 |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0243604 A1 * | 11/2005 | Harken ...................... G06F 8/51 |
| | | 365/185.22 |
| 2005/0251533 A1 * | 11/2005 | Harken ............... G06F 17/2247 |
| 2005/0256908 A1 * | 11/2005 | Yang ................. G06F 17/30569 |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0005346 A1 * | 1/2012 | Burckart ................ G06F 9/5077 |
| | | 709/226 |

(56) References Cited

U.S. PATENT DOCUMENTS

| | | | |
|---|---|---|---|
| 2012/0042218 A1 | 2/2012 | Cinarkaya et al. | |
| 2012/0218958 A1 | 8/2012 | Rangaiah | |
| 2012/0233137 A1 | 9/2012 | Jakobson et al. | |
| 2012/0331016 A1* | 12/2012 | Janson | G06F 17/30557 707/809 |
| 2013/0036094 A1* | 2/2013 | Fippel | G06Q 10/06 707/640 |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya et al. | |
| 2014/0123296 A1* | 5/2014 | Subramanian | H04L 67/10 726/26 |
| 2014/0181039 A1* | 6/2014 | Harrison | G06F 17/30091 707/652 |
| 2014/0181579 A1* | 6/2014 | Whitehead | G06F 17/30289 714/15 |
| 2014/0351106 A1* | 11/2014 | Furr | G06Q 20/145 705/34 |
| 2015/0200958 A1* | 7/2015 | Muppidi | H04L 41/28 726/23 |
| 2015/0281233 A1* | 10/2015 | Asenjo | G06F 21/44 726/7 |
| 2015/0281319 A1* | 10/2015 | Maturana | G06F 9/5072 709/202 |
| 2015/0317339 A1* | 11/2015 | Vranyes | G06Q 10/00 707/695 |
| 2015/0331870 A1* | 11/2015 | Bystrom | G06F 17/30058 707/661 |
| 2016/0162374 A1* | 6/2016 | Mutha | G06F 3/06 714/19 |
| 2017/0139949 A1* | 5/2017 | Aviyam | G06F 17/30156 |
| 2017/0180368 A1* | 6/2017 | Paterra | H04L 63/0876 |
| 2017/0277698 A1* | 9/2017 | Heard | G06F 17/30079 |

OTHER PUBLICATIONS

"Salesforce Multitenant Architecture", retrieved on Jan. 9, 2019 from http://www.infallibletechie.com/2013/05/salesforce-multitenant-architecture.html, published in May 2013 (Year: 2013).*

Dan Woods, "Salesforce.com's Secret Sauce", retrieved on Jan. 9, 2019 from https://www.forbes.com/2009/01/12/cio-salesforce-multitenancy-tech-cio-cx_dw_0113salesforce.html#165e08b45506, published on Jan. 13, 2009 (Year: 2009).*

"The Force.com Multitenant Architecture", retrieved on Jan. 9, 2019 from http://www.developerforce.com/media/ForcedotconnBookLibrary/Force.com_Multitenancy_WP_101508.pdf, published on (Year: 2008).*

* cited by examiner

HOME > BUNDLES > FORCEBIT > METADATA

APP METADATA
ForceBit — 300

SOURCE DEMO ORG          STATUS
Haiku.dev

LAST UPDATE
2016-03-02

⚠ When changing the selection on preselected available component checkboxes, please click multiple time. This is a known issue.

Available Components — 310
Step 1: Select the Source Org — 312
Haiku.dev

Step 2: Select a metadata type to package — 322
Apex Class

3 Component[s] found.

Workbench Link - ApexClass

| SELECT | COMPONENT |
|---|---|
| ☐ | DocumentUploadController |
| ☐ | HaikuCartProduct |
| ☐ | WebServiceCallout — 332 |

[UPDATE METADATA ASSET]

324

Selected Components — 330

| METADATA | COMPONENT |
|---|---|
| CustomObject | Forcebit_Related_Content_c<br>Workout_c<br>Forcebit_Cart_Item_c<br>Forcebit_Day_c<br>Forcebit_Order_c<br>Forcebit_Product_c<br>Forcebit_Log_c |
| Layout | Forcebit_Related_Content_c-Forcebit Related Product Layout<br>Forcebit_Cart_Item_c-Forcebit Cart Item Layout<br>Forcebit_Products_c-Forcebit Product Layout<br>Forcebit_Log_c-Forcebit Log Layout<br>Forcebit_Day_c-Forcebit Day Layout<br>Forcebit_Order_c-Forcebit Order Layout<br>Workout_c-Workout Layout |
| CustomTab | Forcebit_Product_c<br>Forcebit_Day_c<br>Workout_c<br>Forcebit_Cart_Item_c<br>Forcebit_Related_Content_c<br>Forcebit_Order_c<br>Forcebit_Log_c |
| CustomApplication | forcebit |
| Flow | Forcebit_Cart-1<br>Cart-2<br>Cart-1<br>Cart-3<br>Cart |

FIG. 3

METHOD AND SYSTEM FOR RE-DEPLOYING METADATA AND ASSOCIATED DATA FROM A SOURCE ORGANIZATION TO A DESTINATION ORGANIZATION

TECHNICAL FIELD

Embodiments of the subject matter described herein relate generally to cloud-based computing. More particularly, embodiments of the subject matter relate to methods and systems for re-deploying metadata and associated data from a source organization of a cloud-based computing environment to a destination organization of the cloud-based computing environment.

BACKGROUND

Today many enterprises now use cloud-based computing platforms that allow services and data to be accessed over the Internet (or via other networks). Infrastructure providers of these cloud-based computing platforms offer network-based processing systems that often support multiple enterprises (or tenants) using common computer hardware and data storage. This "cloud" computing model allows applications to be provided over a platform "as a service" supplied by the infrastructure provider.

Multi-tenant cloud-based architectures have been developed to improve collaboration, integration, and community-based cooperation between customer tenants without compromising data security. Generally speaking, multi-tenancy refers to a system where a single hardware and software platform simultaneously supports multiple customers or tenants from a common data storage element (also referred to as a "multi-tenant data store"). The multi-tenant design provides a number of advantages over conventional server virtualization systems. First, the multi-tenant platform operator can often make improvements to the platform based upon collective information from the entire tenant community. Additionally, because all users in the multi-tenant environment execute applications within a common processing space, it is relatively easy to grant or deny access to specific sets of data for any user within the multi-tenant platform, thereby improving collaboration and integration between applications and the data managed by the various applications. The multi-tenant architecture therefore allows convenient and cost effective sharing of similar application feature software between multiple sets of users.

A cloud-based computing environment can include a number of different data centers, and each data center can include a number of instances, where each instance can support many tenants (e.g., 10,000 tenants or more). As such, large numbers of tenants can be grouped together into and share an instance as tenants of that instance. Each tenant has its own organization (or org). An organization or "org" is a unique identifier (ID) that represents that tenant's data within an instance. Each identifier defines a virtual or logical space provided to an individual tenant (e.g., a defined set of users) where all of that tenant's data and applications are stored within an instance so that it is separate from that of all other organizations that are part of that instance. An organization can be thought of as a logical container for one cohesive set of related data, metadata, configurations, settings and schemas that is separate from that of all other organizations. Each organization can be highly customized with respect to other organizations that are part of the same instance, and can include custom fields, custom objects, workflows, data sharing rules, visual force pages and apex coding because even though all tenants with an instance share the same database, the organization ID is stored in every table to ensure that every row of data is linked back to the correct tenant and the data from other tenants sharing the same instance cannot be mixed up.

Each organization can have its own custom content that is unique to that particular organization. For a particular organization, custom content can include metadata and associated data that is unique to that particular organization. While custom content can be migrated between organizations, current approaches for the migration of custom content between organizations are time-consuming and monotonous. In addition, relational data migration has a high chance of user error because users have to manually update relation keys.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 3 illustrates a screenshot that shows an example of a metadata package screen where the user can point-and-click to select metadata to include in a manifest file in accordance with the disclosed embodiments.

DETAILED DESCRIPTION

Figure 1:
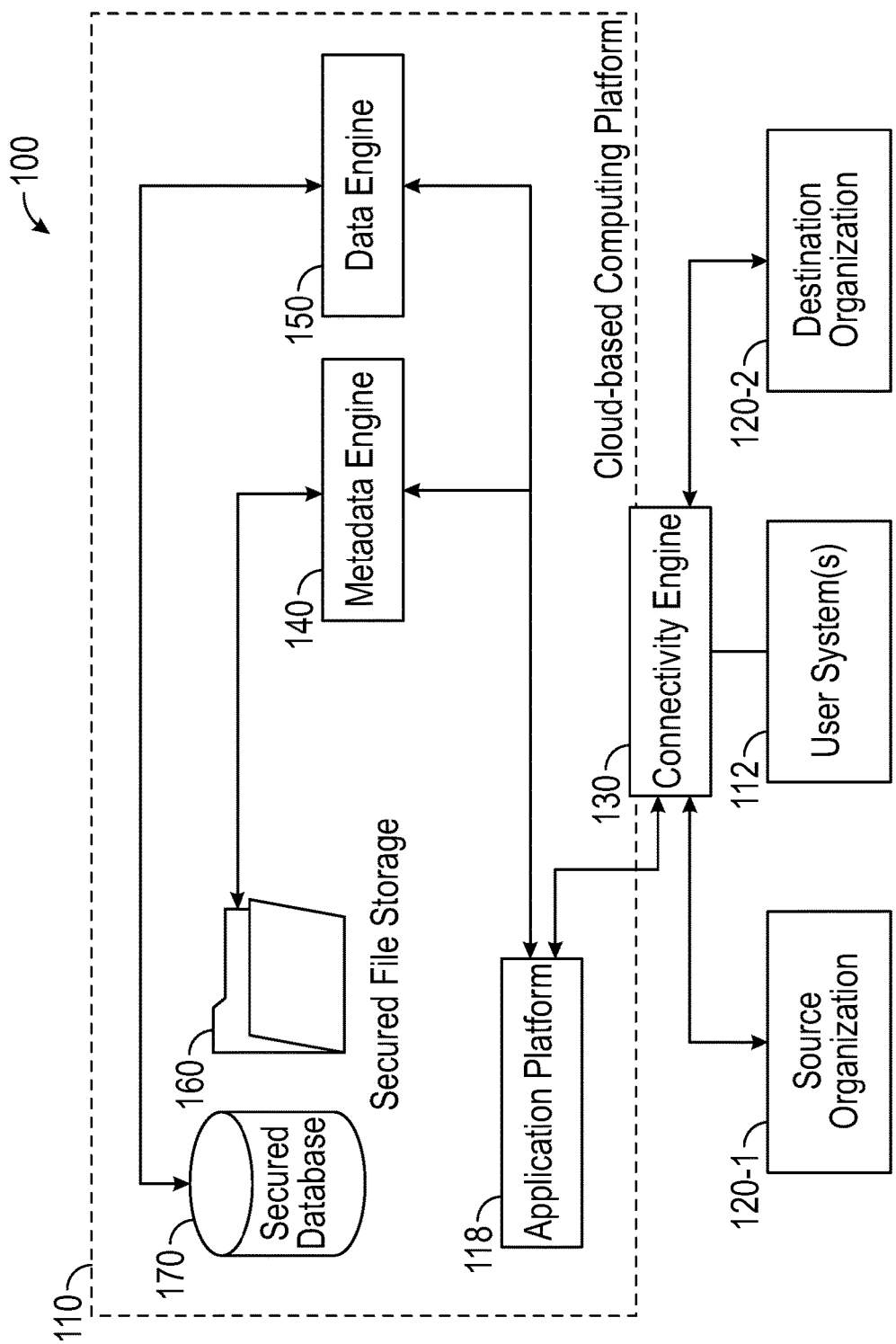
FIG. 1 is a block diagram of a system in accordance with the disclosed embodiments.

The exemplary embodiments presented here relate to systems, methods, procedures, and technology for re-deploying metadata and associated data from a source organization of a cloud-based computing environment to a destination organization of the cloud-based computing environment. The described subject matter can be implemented in the context of any cloud-based computing environment including, for example, a multi-tenant database system.

To address the issues discussed above, systems and methods are provided for re-deploying metadata and data from a source organization of a cloud-based computing environment to a destination organization of the cloud-based computing environment. In one embodiment, a user system can be used to select metadata that is to be retrieved from the source organization. A metadata engine can then be used to automatically create a first file that comprises the selected metadata that is to be retrieved from the source organization. The selected metadata can then be packaged into a manifest file that can then be stored at secure file storage where it is securely stored for re-deployment to another organization. A data engine can then be instructed to automatically retrieve data associated with the selected metadata (that is stored in the manifest file) based, for example, on objects specified in the selected metadata. Once retrieved, the data associated with the selected metadata can be automatically saved and stored at a secured database for re-deployment to another organization. Thereafter, both the manifest file of the selected metadata and the data associated with the selected metadata can be re-deployed to the destination organization. The data engine can automatically reconstruct relationships amongst records (i.e., data) that has been successfully migrated to the destination organization and new identifiers (IDs) at the destination organization that are associated with those records. This automated system is not only more efficient and faster, but can also help improve relational data migration of custom content between organizations because it can eliminate or reduce errors. For instance, there is no need to manually update relation keys when custom content can be migrated between organizations.

As such, an end user can select and package up his/her organization's metadata and data, and re-deploy them to another organization while maintaining relationships between that metadata and data. The metadata can be customizations for that particular source organization that a user wants to re-deploy at a new destination organization. This point-and-click solution provides a quick way for users to move metadata and data between their different organizations. One advantage is that the end user can very quickly and efficiently cherry-pick metadata and data that he/she wants to re-deploy to a new destination organization. By allowing a user to move metadata via a re-deployment time and development costs can be saved. For instance, once a system is built for a source organization, that work can be leveraged via re-deployment. A user can move the metadata for the source organization to the new destination organization, and then make modifications needed for the destination organization without having to start from scratch and completely rebuild the system.

Prior to describing an exemplary embodiment with reference to FIG. 1, certain terminology will be defined.

As used herein, the term "multi-tenant database system" refers to those systems in which various elements of hardware and software of the database system may be shared by one or more tenants. For example, a given application server may simultaneously process requests for a great number of tenants, and a given database table may store rows for a potentially much greater number of tenants. In a multitenant architecture a number of tenants share IT resources such as database servers, application servers, and infrastructure required to run applications, resulting in an environment where resources are managed centrally.

A cloud-based computing environment can include a number of different data centers. Each data center can include a number of instances. Each instance can support many (e.g., 10,0000) tenants, where each tenant has their own organization (or org).

An instance (also known as a point of deployment (POD)) is a cluster of software and hardware represented as a single logical server that hosts multiple organization's data and runs their applications. An instance can be a self-contained unit that contains all that is required to run an instance including the application server, database server, database itself, search and file system. Large numbers of tenants, for example, 10,000, can be grouped together into and share an instance as tenants of that instance. A platform as a service (PaaS), such as the Force.com platform, can run on multiple instances, but data for any single organization is always stored on a single instance where their data resides. Each tenant is allocated to one and only one instance (or POD) and that is where their data resides. As such, an instance refers to a single logical server that multiple organizations live on as tenants. An instance can be identified in a URL by a region and a server number. For example, if it is assumed that there are currently 21 instances in North America, in the URL na8.salesforce.com, nab can refer to particular server, where na refers to the general location of the server (North America) and 8 refers to the serverID within that general location (server 8 of 21 in North America).

An organization or "org" is a unique identifier (ID) that represents that tenant's data within an instance. Each identifier defines a virtual or logical space provided to an individual tenant (e.g., a deployment of Salesforce with a defined set of licensed users) where all of that tenant's data and applications are stored within an instance so that it is separate from that of all other organizations that are part of that instance. As such, each organization can be identified by its own unique ID that allows that organization's data to be separated from data of other organizations. The ID serves as an access key and a security barrier for an individual tenant's data in the system. An organization can be thought of as a logical container for one cohesive set of related data, metadata, configurations, settings and schemas. An organization includes all of a tenant's data and applications, and is separate from that of all other organizations. Each organization can be highly customized with respect to other organizations that are part of the same instance, and can include custom fields, custom objects, workflows, data sharing rules, visual force pages and apex coding because even though all tenants with an instance share the same database, the organization ID is stored in every table to ensure that every row of data is linked back to the correct tenant and the data from other tenants sharing the same instance cannot be mixed up.

An environment is an organization used for a specific purpose. An organization can be used as a production environment unless it is housed on a sandbox instance, in which case the organization can be used for development, testing, integration, training or other non-production purposes. For example, tenants may have an organization is used as a production environment, another organization used for a development environment, another organization used for testing environment, another organization used for integration environment, another organization used for their training environment.

FIG. 1 is a block diagram of a system 100 in accordance with the disclosed embodiments. The system 100 includes a cloud-based computing platform 110, one or more user systems 112, a source organization 120-1, and a destination organization 120-2. In accordance with the disclosed embodiments, the source organization 120-1 is a source of metadata and associated data that make up an application. The destination organization 120-2 is a destination where that metadata and the associated metadata are to be re-deployed. In other words, the metadata and the data associated with that metadata collectively make up an application that can be re-deployed to or at the destination organization 120-2. For instance, in one implementation, the selected metadata can include customized content of the source organization 120-1. Stated differently, metadata can refer to customized content or customizations done to an instance that define business logic and processes for an organization. Some non-limiting examples of metadata can include, for example, customized content that describes a build and functionality of objects (or tables), tabs, fields (or columns), permissions, classes, pages (e.g., Apex pages), triggers, controllers, sites, communities, workflow rules, automation rules and processes, etc. Data is associated with metadata to create an application. Data can be stored as one or more objects, where each object holds particular records for an organization. As such, data can include records (or user content) that are held by one or more objects. For example, an "account" object can hold account records in an organization.

The cloud-based computing platform 110 is a system that can be shared by many different organizations, and handles the storage of, and access to, different metadata, objects, data and applications across disparate organizations. In one embodiment, the cloud-based computing platform 110 can be part of a database system, such as a multi-tenant database system. The cloud-based computing platform 110 is configured to handle requests for any user associated with any organization that is a tenant of the system. Although not illustrated, the cloud-based computing platform 110 can include other components such as a tenant database where metadata and data are stored, a system database, one or more processing systems that execute the application, process space where the application runs, program code, and a network interface that will be described in greater detail below.

The cloud-based computing platform 110 includes an application platform 118, a connectivity engine 130, a metadata engine 140, a data engine 150, secure file storage 160, and a secured database 170.

The application platform 118 is a cloud-based user interface that engages the metadata engine 140 and the data engine 150 based on the user's interaction with the user system 112.

The connectivity engine 130 serves as an interface that allows users of user systems 112 to establish a communicative connection to the cloud-based computing platform 110 over a network such as the Internet. In one embodiment, the connectivity engine 130 can include an OAuth generator that provides organization tokens for a particular session. OAuth is an open standard for authorization that provides to clients a secure delegated access to server resources on behalf of a resource owner. OAuth standards specify a process for resource owners to authorize access to their server resources without sharing their credentials. OAuth allows access tokens to be issued to clients by an authorization server, with the approval of the resource owner. The client can then use the access token to access the protected resources hosted by the resource server.

The metadata engine 140 can be used to select metadata that is to be packaged for re-deployment to another organization, pull it from a database, such as a tenant database (not illustrated in FIG. 1), package that selected metadata, and save that package of selected metadata at the secure file storage 160. When a user requests re-deployment of the package of selected metadata to another destination organization, the metadata engine 140 can be used to retrieve the package from the secure file storage 160 and push the package to a specified destination organization.

For example, in one embodiment, after creating a connection to the source organization 120-1 via the connectivity engine 130 so that the user is permitted to access an application, the user can, via the user system 112, interact with the metadata engine 140 to select metadata that is to be retrieved from the source organization 120-1. For instance, in one implementation, the user can interact with (e.g., point-and-click) certain elements of a graphical user interface (GUI) displayed via the user system to select the metadata to be retrieved from the source organization 120-1. The metadata engine 140 can then automatically create a first file (e.g., an Extensible Markup Language (XML) file) that comprises the selected metadata that is to be retrieved from the source organization 120-1. The selected metadata can then be automatically packaged into a manifest file (e.g., a ZIP file whose contents of one or more files are compressed). For instance, in one implementation, the user can interact with (e.g., point-and-click) another element of the GUI to cause the metadata engine 140 to automatically create the first file that includes the selected metadata from the source organization 120-1, and then automatically package the selected metadata into the manifest file. The manifest file can then be stored at the secure file storage 160 where it is securely stored for re-deployment to another organization, which is assumed to be the destination organization 120-2 in the example that is illustrated in FIG. 1.

The secure file storage 160 is used to securely store manifest files in an organized folder structure with the organization ID being the main key to help ensure no mixups or wrongful contamination. In one embodiment, the secure file storage 160 can be a separate file storage system provided a cloud computing services provider (e.g., Amazon Web Services).

The data engine 150 can be used to choose or select data that is associated with the selected metadata (e.g., that has been packaged for re-deployment to another organization and been stored at the secure file storage 160), pull that data from a database, such as a tenant database (not illustrated in FIG. 1), and push the selected data from the secured database 170 to a destination organization when requested by a user.

For example, in one embodiment, the data engine 150 can automatically retrieve data associated with the selected metadata (that is stored) in the manifest file either in response to the manifest file being created or stored, or in response to a command or selection by the user or instruction from the user. For example, in one embodiment, the user can, via the user system 112, interact with a graphical user interface element (displayed at the user system 112) to instruct or cause the data engine 150 to automatically retrieve the data associated with the selected metadata (that is stored in the manifest file). The data engine 150 can automatically retrieve the data from the source organization based, for example, on objects specified in the selected metadata. Once retrieved, the data associated with the selected metadata can be automatically saved and stored at the secured database 170 for re-deployment to the destination organization 120-2.

The secured database 170 is an external database that is accessible by the cloud-based computing platform 110. The secured database 170 stores data (e.g., records held by an object) from an organization after retrieval from a tenant database (not illustrated in FIG. 1). The secured database 170 can also store user information, session information, application definitions and organization connection data along with the data records. In one implementation, the organization's data can be stored in a custom JavaScript Object Notation (JSON) format that is used by the data engine 150.

When the user of the user system 112 wants to re-deploy the manifest file (that includes the selected metadata) and the data associated with that selected metadata to the destination organization 120-2, the user can interact with a GUI at the user system 112 to quickly and efficiently re-deploy the selected metadata and associated data. For instance, in one embodiment, the user can select, via the GUI, the manifest file and specify the destination organization that the manifest file is to be re-deployed to. This can cause the metadata engine 140 to automatically retrieve the manifest file from the secure file storage 160, and send the manifest file to the destination organization 120-2. The data associated with the selected metadata can then be re-deployed as components to the destination organization 120-2. The trigger for retrieving the data varies depending on the implementation. In one embodiment, the data engine 150 automatically retrieves the data from the secured database 170 in response to the manifest file being retrieved, and then sends it to the destination organization 120-2. In other words, no user interaction is required. In another embodiment, the user can select the data that is to be deployed, and the data engine 150 automatically retrieves the data from the secured database 170 in response to some input from the user (via the user system 112), such as a selection, command, etc., and then automatically sends it to the destination organization 120-2. Regardless of the embodiment, the data engine 150 automatically determines the data associated with selected objects specified in the selected metadata from the secured database 170, and then retrieves and sends that data to the destination organization 120-2 as records.

The application platform 118 can provide real-time updates to the user system 112 that are presented at the user system 112 to show the number of metadata components and data records that have been successfully migrated to the destination organization 120-2.

The data engine 150 can automatically reconstruct relationships amongst data (e.g., records) that have been successfully migrated to the destination organization and new identifiers (IDs) at the destination organization 120-2 that are associated with that data (e.g., records).

Various events or tasks performed by the various elements in FIG. 1 will be described in greater detail below with reference to FIGS. 2 and 5. For example, certain operations performed at or by the cloud-based computing platform 110 (or elements thereof), the source organization 120-1, the secure file storage 160, the secured database 170 and the destination organization 120-2 of the system 100 will be described below. In that regard, FIGS. 2-7 will be described with continued reference to FIG. 1.

Figure 2:
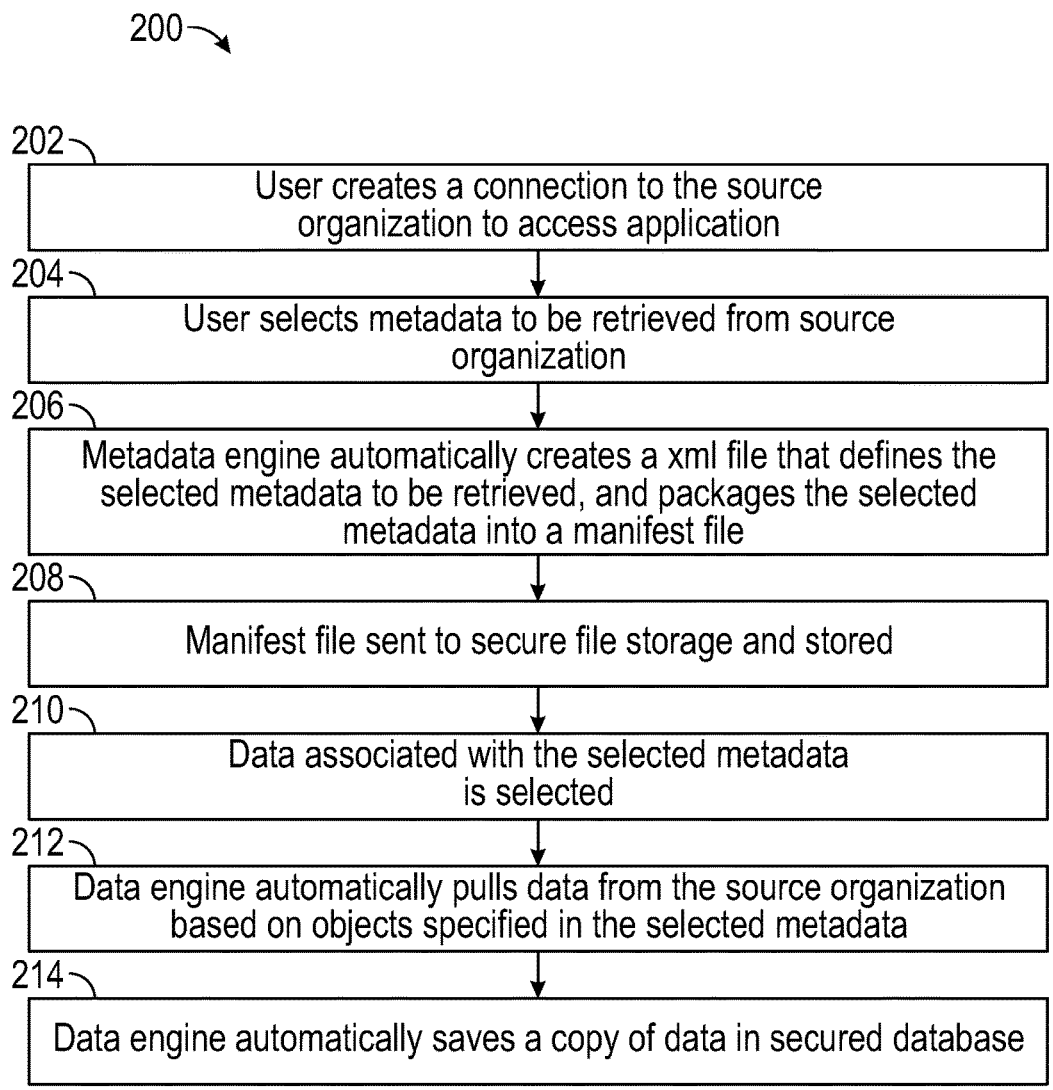
FIG. 2 is a flow chart that illustrates an exemplary method for selecting metadata and data of a source organization for re-deployment to another organization in accordance with the disclosed embodiments.

FIG. 2 is a flow chart that illustrates an exemplary method 200 for selecting metadata and data of a source organization 120-1 for re-deployment to another organization in accordance with the disclosed embodiments. As a preliminary matter, it should be understood that steps of the method 200 are not necessarily limiting, and that steps can be added, omitted, and/or performed simultaneously without departing from the scope of the appended claims. It should be appreciated that the method 200 may include any number of additional or alternative tasks, that the tasks shown in FIG. 2 need not be performed in the illustrated order, and that the method 200 may be incorporated into a more comprehensive procedure or process having additional functionality not described in detail herein. Moreover, one or more of the tasks shown in FIG. 2 could potentially be omitted from an embodiment of the method 200 as long as the intended overall functionality remains intact. It should also be understood that the illustrated method 200 can be stopped at any time. The method 200 is computer-implemented in that various tasks or steps that are performed in connection with the method 200 may be performed by software, hardware, firmware, or any combination thereof. For illustrative purposes, the following description of the method 200 may refer to elements mentioned above in connection with FIG. 1. In certain embodiments, some or all steps of this process, and/or substantially equivalent steps, are performed by execution of processor-readable instructions stored or included on a processor-readable medium.

For instance, in the description of FIG. 2 that follows, the source organization 120-1, the cloud-based computing platform 110, the connectivity engine 130, the metadata engine 140, the data engine 150, the secure file storage 160, the secured database 170 and the destination organization 120-2 will be described as performing various acts, tasks or steps, but it should be appreciated that this refers to processing system(s) of these entities executing instructions to perform those various acts, tasks or steps. Depending on the implementation, some of the processing system(s) can be centrally located, or distributed among a number of server systems that work together. Furthermore, in the description of FIG. 2, a particular example is described in which a user of a user system performs certain actions by interacting with other elements of the system via the user system.

The method 200 begins at 202 when a user of the user system 112 creates or establishes a connection to the source organization 120-1 via the connectivity engine 130 (e.g., authorization server oAuth) of the source organization 120-1 so that user is permitted to access an application of the cloud-based computing platform 110. As will be described in greater detail below, the application comprises metadata and associated data.

At 204, the user of the user system 112 can point-and-click to select metadata that is to be retrieved from the source organization 120-1, and packaged for re-deployment to another organization referred to above as the destination organization 120-2.

FIG. 3 illustrates a screenshot that shows an example of a metadata package screen 300 where the user can point-and-click to select metadata to include in a manifest file in accordance with the disclosed embodiments. The metadata packet screen 300 can include a first region 310 and a second region 330. The first region 310 is used to input information to select a source organization via drop-down menu 314, and to input information regarding different metadata types that can be included in the manifest file via a drop-down menu at 322. When the user selects a particular metadata type via the drop-down menu 322, a menu appears at 324 which lists different components for that particular metadata type that is selected via the drop-down menu 322. Within 324, the user can select checkboxes for each component (for that particular metadata type) that they want to be included in manifest file. When the user has selected each of the components (for that particular metadata type) that they want to include in the manifest file, the user can select the action button at 332 to add this metadata asset to the manifest file. The user can repeat this process for each metadata type, and select the action button 332 to add selected components for that metadata type to the manifest file. The second region 330 shows a list of all the selected components (for all metadata types) that are to be included in the manifest file. In this particular implementation, the first column includes the metadata type, for example, custom objects, layout, custom tab, custom application, and flow, and the second column includes various components for each of the metadata types that have been selected for inclusion in the manifest file. For example, for the metadata type "custom application," only one component (i.e., forcebit) has been selected for inclusion in the manifest file for that metadata type.

Referring again to FIG. 2, at 206, the metadata engine 140, automatically creates a package file that defines the selected metadata that is to be retrieved out of the source organization 120-1, and packages the selected metadata into a manifest file. In one embodiment, the package file can be an eXtensible markup language file (or .xml file), whereas the manifest file can be a .zip file. An .xml file is a file whose contents are written in XML markup language. A .zip file is a structured computer file whose contents of one or more files are compressed for storage or transmission. At 208, the manifest file is sent to the secure file storage 160 where it is securely stored for re-deployment.

At 210, the user of the user system 112 points-and-clicks to instruct the data engine 150 to retrieve data associated with the selected metadata (from 204) from the source organization 120-1. At 212, the data engine 150 automatically pulls the data from the source organization 120-1 based on objects specified in the selected metadata, and automatically saves (at 214) a copy of the pulled data in the secured database 170 where it is available for re-deployment to the destination organization 120-2.

Figure 4:
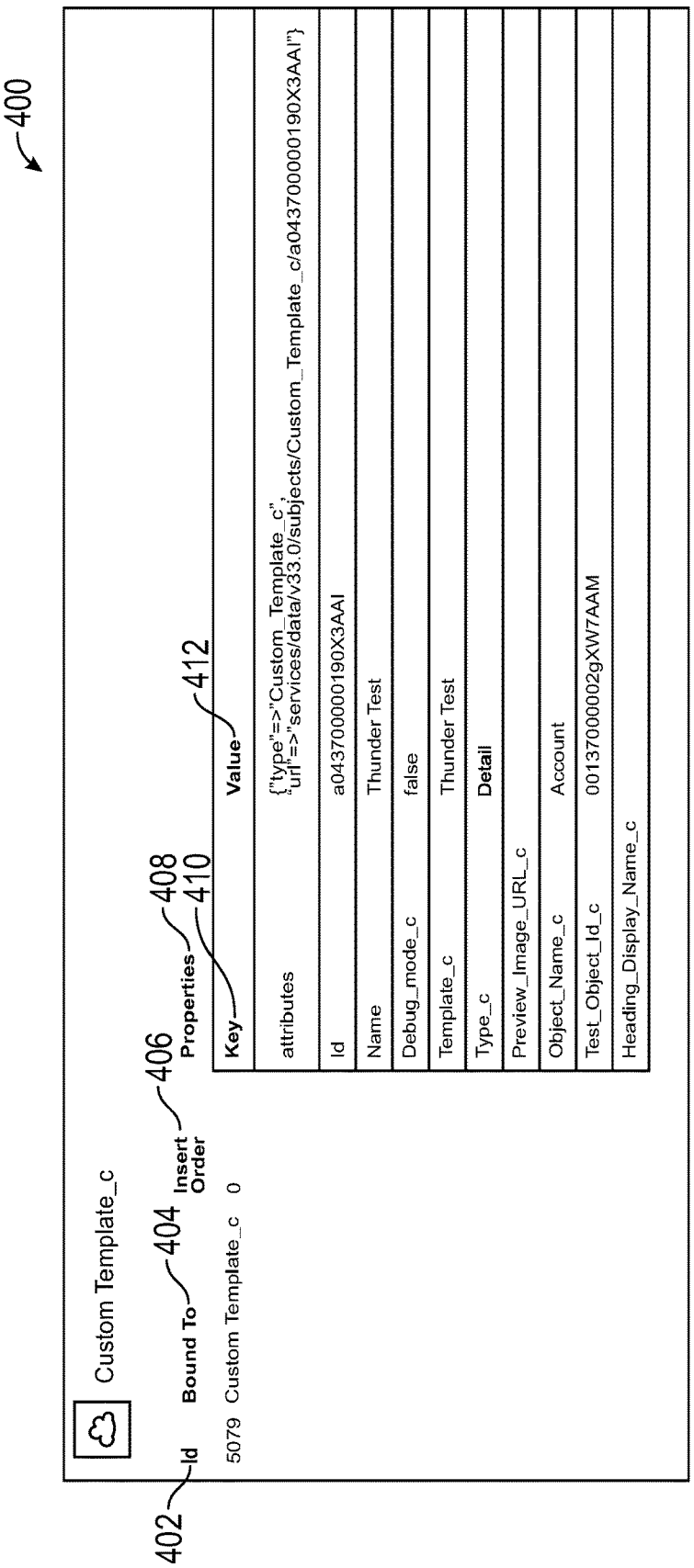
FIG. 4 illustrates a screenshot that shows an example of the format in which data is captured and stored in the secured database in accordance with the disclosed embodiments.

FIG. 4 illustrates a screenshot that shows an example of the structure format in which data is captured and stored in the secured database 170 in accordance with the disclosed embodiments. In one embodiment, the data can be stored in a JSON format. In the template 400, there are number of primary columns, including an ID column 402 that includes an internal ID used to identify the record in the secured database 170, a "bound to" column 404 that includes the object that this data belongs to (e.g., Account, Contact, Lead, etc.), an "insert order" column 406 that includes re-deployment insertion order, and a properties column 408. The properties column 408 includes two sub-columns: a key sub-column 410 and a value sub-column 412. The key sub-column 410 includes specifies a destination field for an object. The value sub-column 412 is the actual content.

Figure 5:
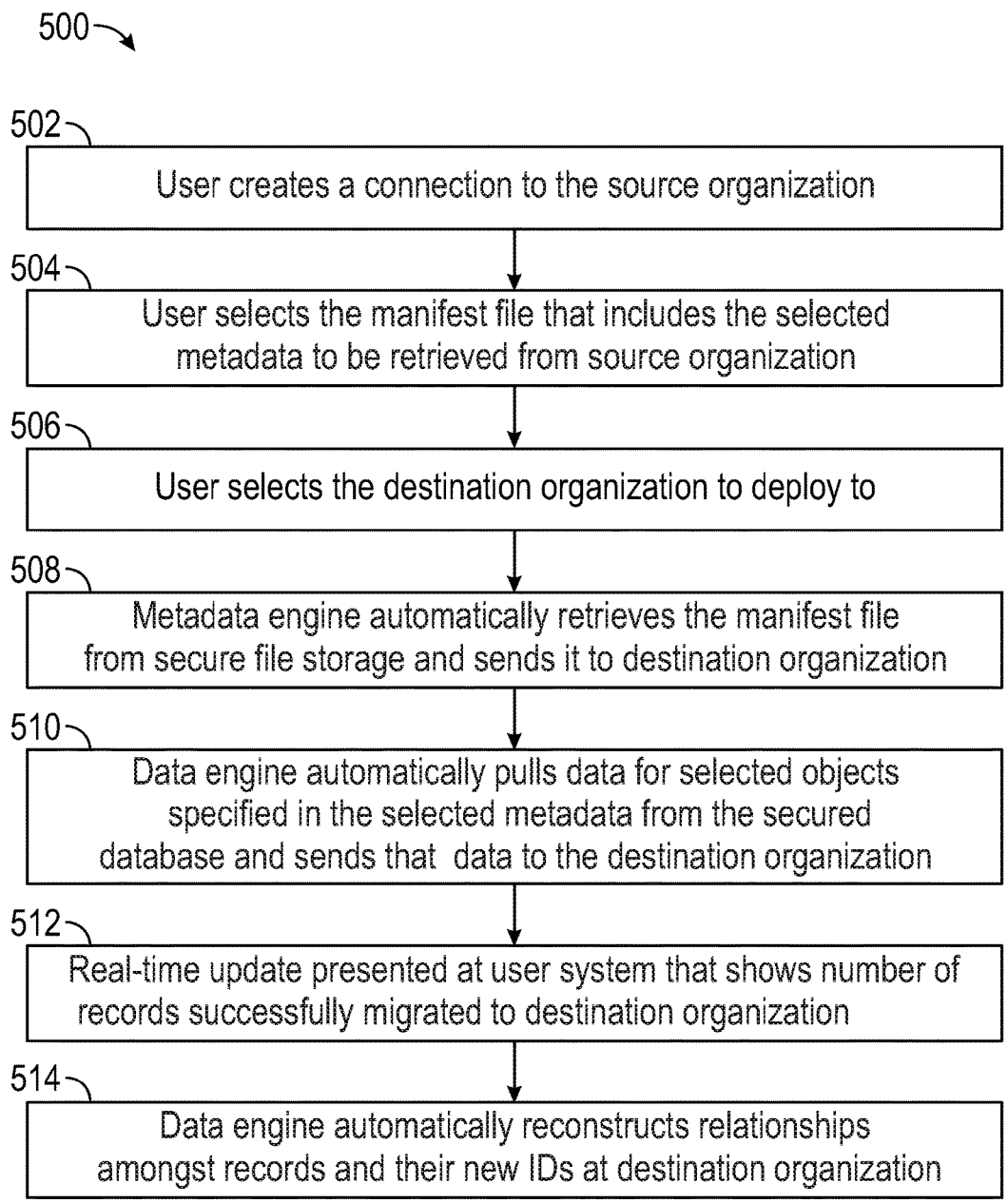
FIG. 5 is a flow chart that illustrates an exemplary method for re-deploying metadata and data for a source organization to a new destination organization in accordance with the disclosed embodiments.

FIG. 5 is a flow chart that illustrates an exemplary method 500 for re-deploying metadata and data for a source organization 120-1 to a new destination organization 120-2 in accordance with the disclosed embodiments. As a preliminary matter, it should be understood that steps of the method 500 are not necessarily limiting, and that steps can be added, omitted, and/or performed simultaneously without departing from the scope of the appended claims. It should be appreciated that the method 500 may include any number of additional or alternative tasks, that the tasks shown in FIG. 5 need not be performed in the illustrated order, and that the method 500 may be incorporated into a more comprehensive procedure or process having additional functionality not described in detail herein. Moreover, one or more of the tasks shown in FIG. 5 could potentially be omitted from an embodiment of the method 500 as long as the intended overall functionality remains intact. It should also be understood that the illustrated method 500 can be stopped at any time. The method 500 is computer-implemented in that various tasks or steps that are performed in connection with the method 500 may be performed by software, hardware, firmware, or any combination thereof. For illustrative purposes, the following description of the method 500 may refer to elements mentioned above in connection with FIG. 1. In certain embodiments, some or all steps of this process, and/or substantially equivalent steps, are performed by execution of processor-readable instructions stored or included on a processor-readable medium. For instance, in the description of FIG. 5 that follows, the source organization 120-1, the cloud-based computing platform 110, the connectivity engine 130, the metadata engine 140, the data engine 150, the secure file storage 160, the secured database 170 and the destination organization 120-2 will be described as performing various acts, tasks or steps, but it should be appreciated that this refers to processing system(s) of these entities executing instructions to perform those various acts, tasks or steps. Depending on the implementation, some of the processing system(s) can be centrally located, or distributed among a number of server systems that work together. Furthermore, in the description of FIG. 5, a particular example is described in which a user of a user system performs certain actions by interacting with other elements of the system via the user system.

The method 500 begins at 502 when the user of the user system 112 creates or establishes a connection to the source organization 120-1 via the connectivity engine 130. This way the user is permitted to access metadata that has been packaged in a manifest file and stored at the secure file storage 160 and its associated data that has been stored at the secured database 170.

At 504, the user of the user system 112 can point-and-click to select a manifest file of selected metadata that is to be re-deployed. This manifest file includes the selected metadata that has been packaged and securely stored at the secure file storage 160. At 506, the user of the user system 112 can point-and-click to select the particular destination organization 120-2 that the manifest file is to be re-deployed to.

At 508, the user of the user system 112 can input a command that causes the metadata engine 140 to automatically retrieve the selected manifest file of the selected metadata from the secure file storage 160, and the metadata engine 140 retrieves the corresponding manifest file from the secure file storage 160 and sends it to the destination organization 120-2. For instance, in one embodiment, the manifest file can be pulled from the secure file storage 160 and deployed to the destination organization 120-2 with a metadata API.

Figure 6:
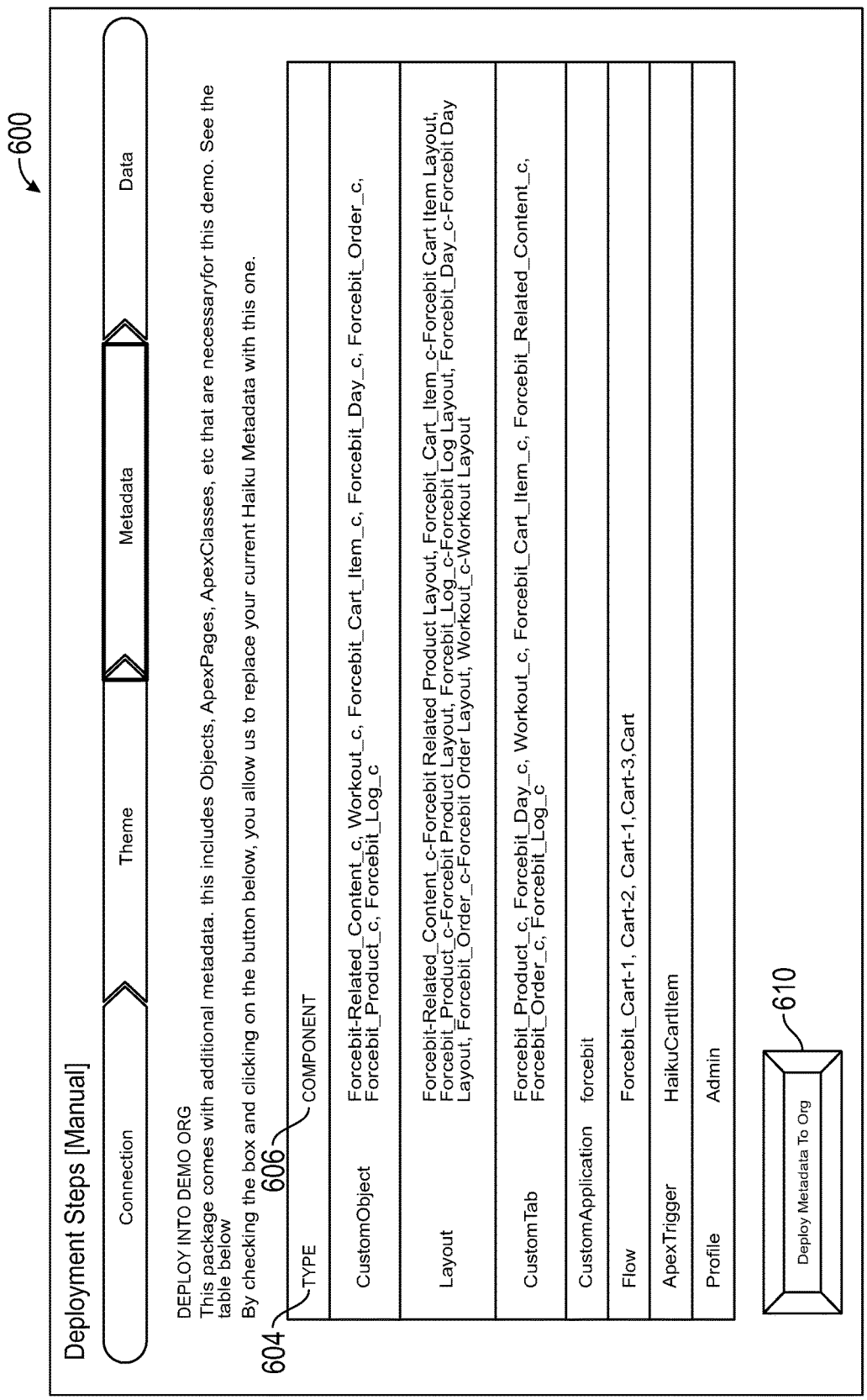
FIG. 6 illustrates a screenshot of a screen that shows an example of metadata that will be deployed to a destination organization as part of a manifest file in accordance with the disclosed embodiments.

FIG. 6 illustrates a screenshot of a screen 600 that shows an example of metadata that will be deployed to a destination organization 120-2 as part of a manifest file in accordance with the disclosed embodiments. If a user selects the deploy metadata action button 610, the manifest file that includes the metadata will be deployed to a destination organization 120-2. In one embodiment, this table includes metadata component types (column 604) and for each type, what actual components will be deployed (column 606). In particular, in column 604, this screen 600 shows the user all of the metadata types that will be included in the manifest file. In this particular example, the metadata types include, for example, custom object, layout, custom tab, custom application, flow, apex trigger, and profile. In column 606, this screen 600 shows the user the components for each particular metadata type that will be included in the manifest file.

At 510, the user of the user system 112 can optionally point-and-click to select the data that is associated with the selected metadata in the manifest file (that was retrieved at 508), and data engine 150 automatically determines data associated with selected objects specified in the selected metadata from the secured database 170 and then retrieves and sends that data to the destination organization 120-2 so that it can be integrated within the destination organization 120-2. In one embodiment, the metadata (e.g., the structure) is deployed as components and data (e.g., the actual content) is deployed as records.

At 512, the application platform 118 can provide real-time updates to the user system 112 that are presented at the user system 112 to show the number of metadata components and data records that have been successfully migrated to the destination organization 120-2. In this context, a successful migration means that the metadata was able to be moved into the destination organization without any conflict or errors and that it is ready to be used.

Figure 7:
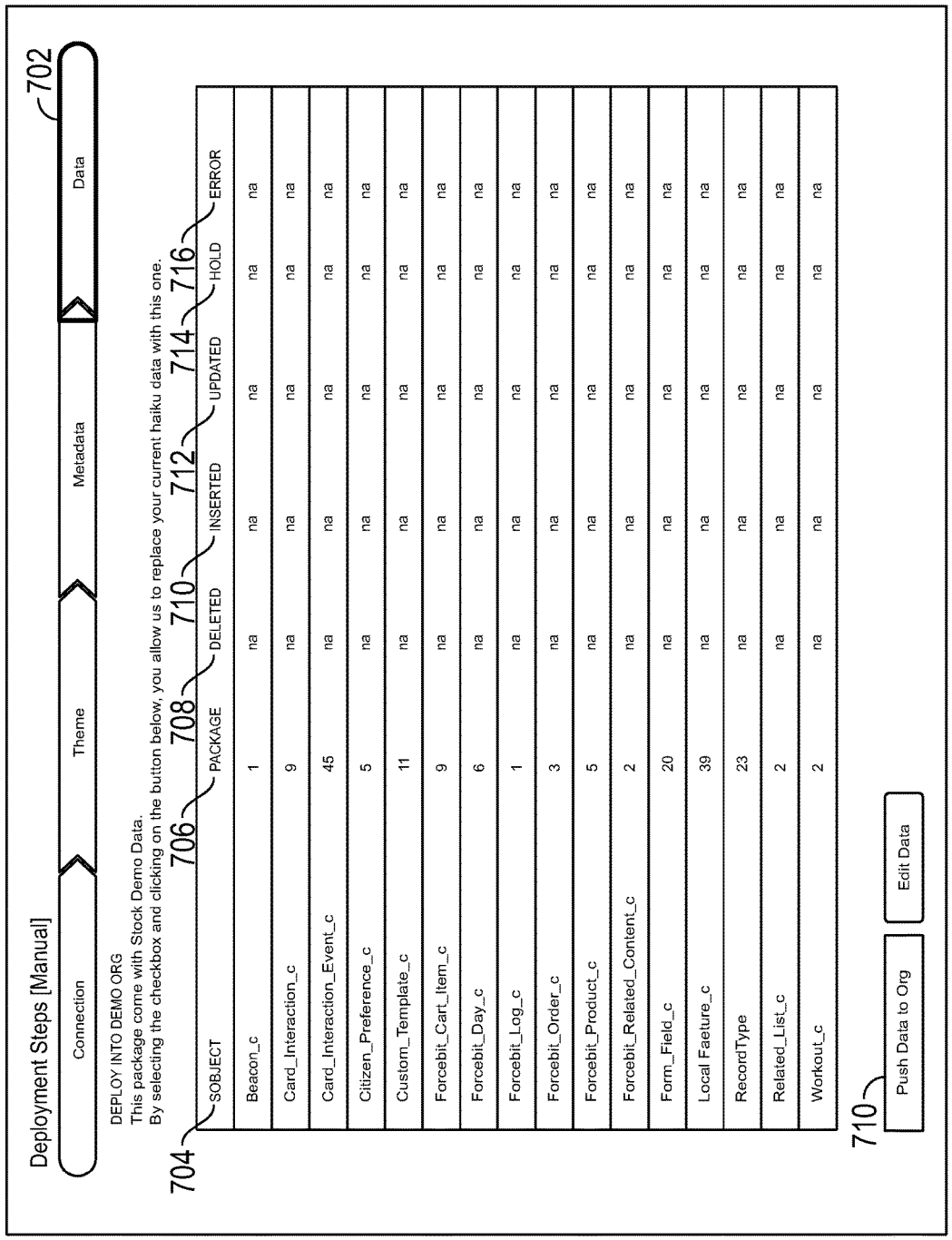
FIG. 7 illustrates a screenshot a screen that shows an example of data being deployed to the destination organization in accordance with the disclosed embodiments.

FIG. 7 illustrates a screenshot a screen 700 that shows an example of data being deployed to the destination organization 120-2 in accordance with the disclosed embodiments. When a user selects the deploy data action button 710, the data that is associated with the metadata included in the manifest file will be deployed to a destination organization 120-2. In one embodiment, the data comprises various objects, where each object corresponds to a component of a particular metadata type. The first column 704 lists various objects that are part of the data being deployed to the destination organization 120-2. Column 706 shows information about which package that particular object is associated with. Columns 708 through 716 provide information about the migration status for each object that is to be migrated to the destination organization 120-2. For example, column 708 indicates whether that particular object was deleted when being migrated to the destination organization, column 710 indicates whether that particular object was successfully migrated (i.e., inserted) at the destination organization, column 712 indicates whether that particular object was successfully migrated and updated at the destination organization, column 714 indicates whether that particular object has been held by the particular organization, and column 716 indicates whether there was an error in migrating that particular object to the destination organization.

At 514, the data engine 150 can automatically reconstruct relationships amongst records and their new identifiers (IDs) at the destination organization 120-2. To explain further, each record that has been successfully migrated to the destination organization 120-2 will be assigned a new, unique identifier associated with that particular destination organization 120-2. This way, records are associated with that particular destination organization 120-2 and will not be mixed up with corresponding records of the source organization 120-1 or other organizations that have different IDs.

The following description is of one example of a system in which the features described above may be implemented. The components of the system described below are merely one example and should not be construed as limiting. The features described above with respect to FIGS. 1-7 may be implemented in any other type of computing environment, such as one with multiple servers, one with a single server, a multi-tenant server environment, a single-tenant server environment, or some combination of the above.

Figure 8:
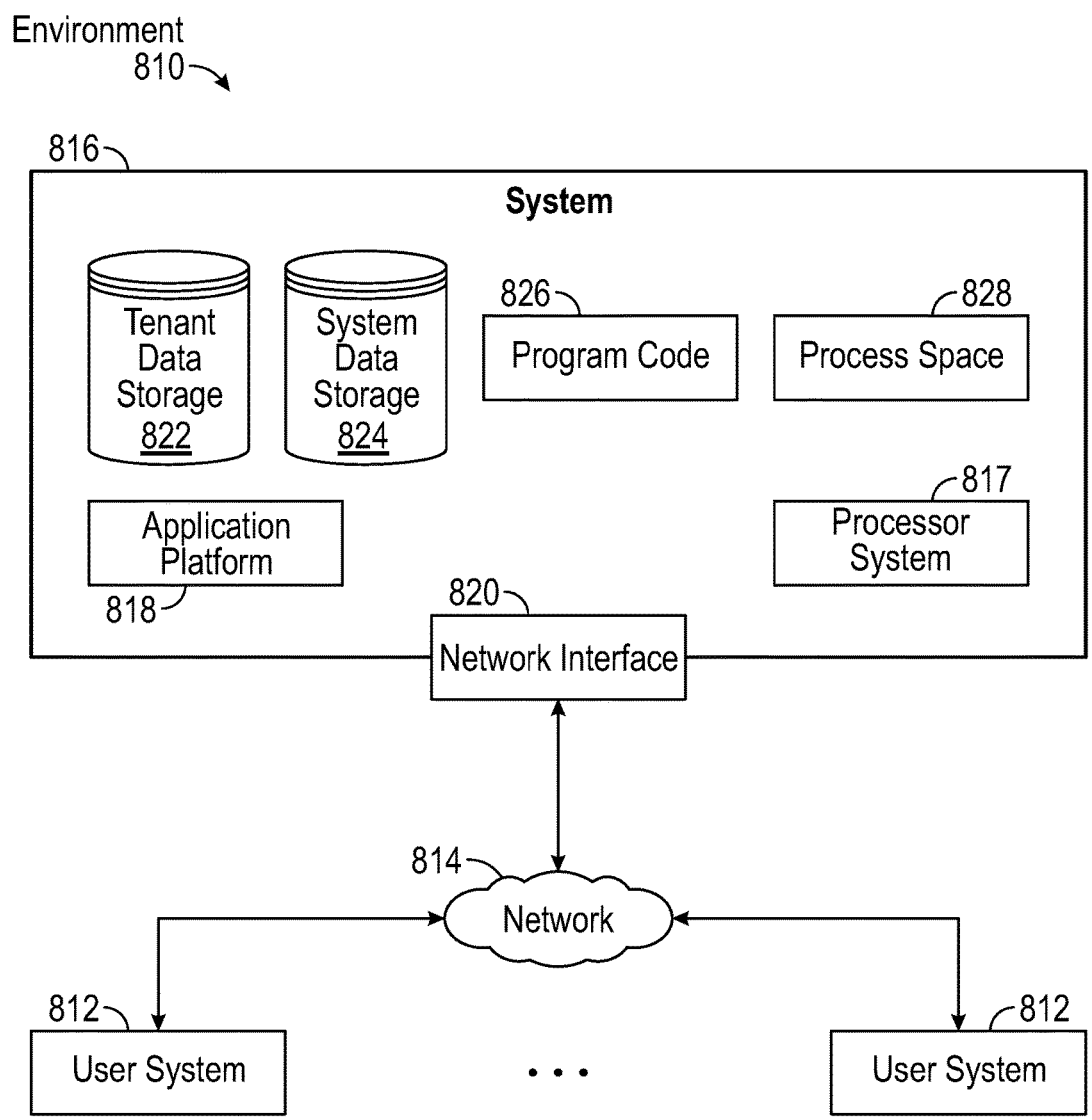
FIG. 8 shows a block diagram of an example of an environment in which an on-demand database service can be used in accordance with some implementations.

FIG. 8 shows a block diagram of an example of an environment 810 in which an on-demand database service can be used in accordance with some implementations. The environment 810 includes user systems 812, a network 814, a database system 816 (also referred to herein as a "cloud-based system"), a processor system 817, an application platform 818, a network interface 820, tenant database 822 for storing tenant data 823, system database 824 for storing system data 825, program code 826 for implementing various functions of the system 816, and process space 828 for executing database system processes and tenant-specific processes, such as running applications as part of an application hosting service. In some other implementations, environment 810 may not have all of these components or systems, or may have other components or systems instead of, or in addition to, those listed above.

In some implementations, the environment 810 is an environment in which an on-demand database service exists. An on-demand database service, such as that which can be implemented using the system 816, is a service that is made available to users outside of the enterprise(s) that own, maintain or provide access to the system 816. As described above, such users generally do not need to be concerned with building or maintaining the system 816. Instead, resources provided by the system 816 may be available for such users' use when the users need services provided by the system 816; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 818 can be a framework that allows the applications of system 816 to execute, such as the hardware or software infrastructure of the system 816. In some implementations, the application platform 818 enables the creation, management and execution of one or more applications developed by the provider of the on-demand database service, users accessing the on-demand database service via user systems 812, or third party application developers accessing the on-demand database service via user systems 812.

In some implementations, the system 816 implements a web-based customer relationship management (CRM) system. For example, in some such implementations, the system 816 includes application servers configured to implement and execute CRM software applications as well as provide related data, code, forms, renderable web pages and documents and other information to and from user systems 812 and to store to, and retrieve from, a database system related data, objects, and Web page content. In some MTS implementations, data for multiple tenants may be stored in the same physical database object in tenant database 822. In some such implementations, tenant data is arranged in the storage medium(s) of tenant database 822 so that data of one tenant is kept logically separate from that of other tenants so that one tenant does not have access to another tenant's data, unless such data is expressly shared. The system 816 also implements applications other than, or in addition to, a CRM application. For example, the system 816 can provide tenant access to multiple hosted (standard and custom) applications, including a CRM application. User (or third party developer) applications, which may or may not include CRM, may be supported by the application platform 818. The application platform 818 manages the creation and storage of the applications into one or more database objects and the execution of the applications in one or more virtual machines in the process space of the system 816.

According to some implementations, each system 816 is configured to provide web pages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 814 can be or include any network or combination of networks of systems or devices that communicate with one another. For example, the network 814 can be or include any one or any combination of a LAN (local area network), WAN (wide area network), telephone network, wireless network, cellular network, point-to-point network, star network, token ring network, hub network, or other appropriate configuration. The network 814 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 812 can communicate with system 816 using TCP/IP and, at a higher network level, other common Internet protocols to communicate, such as HTTP, FTP, AFS, WAP, etc. In an example where HTTP is used, each user system 812 can include an HTTP client commonly referred to as a "web browser" or simply a "browser" for sending and receiving HTTP signals to and from an HTTP server of the system 816. Such an HTTP server can be implemented as the sole network interface 820 between the system 816 and the network 814, but other techniques can be used in addition to or instead of these techniques. In some implementations, the network interface 820 between the system 816 and the network 814 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 812 can be implemented as any computing device(s) or other data processing apparatus or systems usable by users to access the database system 816. For example, any of user systems 812 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 812 typically executes an HTTP client, for example, a web browsing (or simply "browsing") program, such as a web browser based on the WebKit platform, Microsoft's Internet Explorer browser, Netscape's Navigator browser, Opera's browser, Mozilla's Firefox browser, or a WAP-enabled browser in the case of a cellular phone, PDA or other wireless device, or the like, allowing a user (for example, a subscriber of on-demand services provided by the system 816) of the user system 812 to access, process and view information, pages and applications available to it from the system 816 over the network 814.

Each user system 812 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 812 in conjunction with pages, forms, applications and other information provided by the system 816 or other systems or servers. For example, the user interface device can be used to access data and applications hosted by system 816, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 812 may differ in their respective capacities, and the capacity of a particular user system 812 can be entirely determined by permissions (permission levels) for the current user of such user system. For example, where a salesperson is using a particular user system 812 to interact with the system 816, that user system can have the capacities allotted to the salesperson. However, while an administrator is using that user system 812 to interact with the system 816, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 812 and some or all of its components are operator-configurable using applications, such as a browser, including computer code executed using a central processing unit (CPU) such as an Intel Pentium® processor or the like. Similarly, the system 816 (and additional instances of an MTS, where more than one is present) and all of its components can be operator-configurable using application(s) including computer code to run using the processor system 817, which may be implemented to include a CPU, which may include an Intel Pentium® processor or the like, or multiple CPUs.

The system 816 includes tangible computer-readable media having non-transitory instructions stored thereon/in that are executable by or used to program a server or other computing system (or collection of such servers or computing systems) to perform some of the implementation of processes described herein. For example, computer program code 826 can implement instructions for operating and configuring the system 816 to intercommunicate and to process web pages, applications and other data and media content as described herein. In some implementations, the computer code 826 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 9:
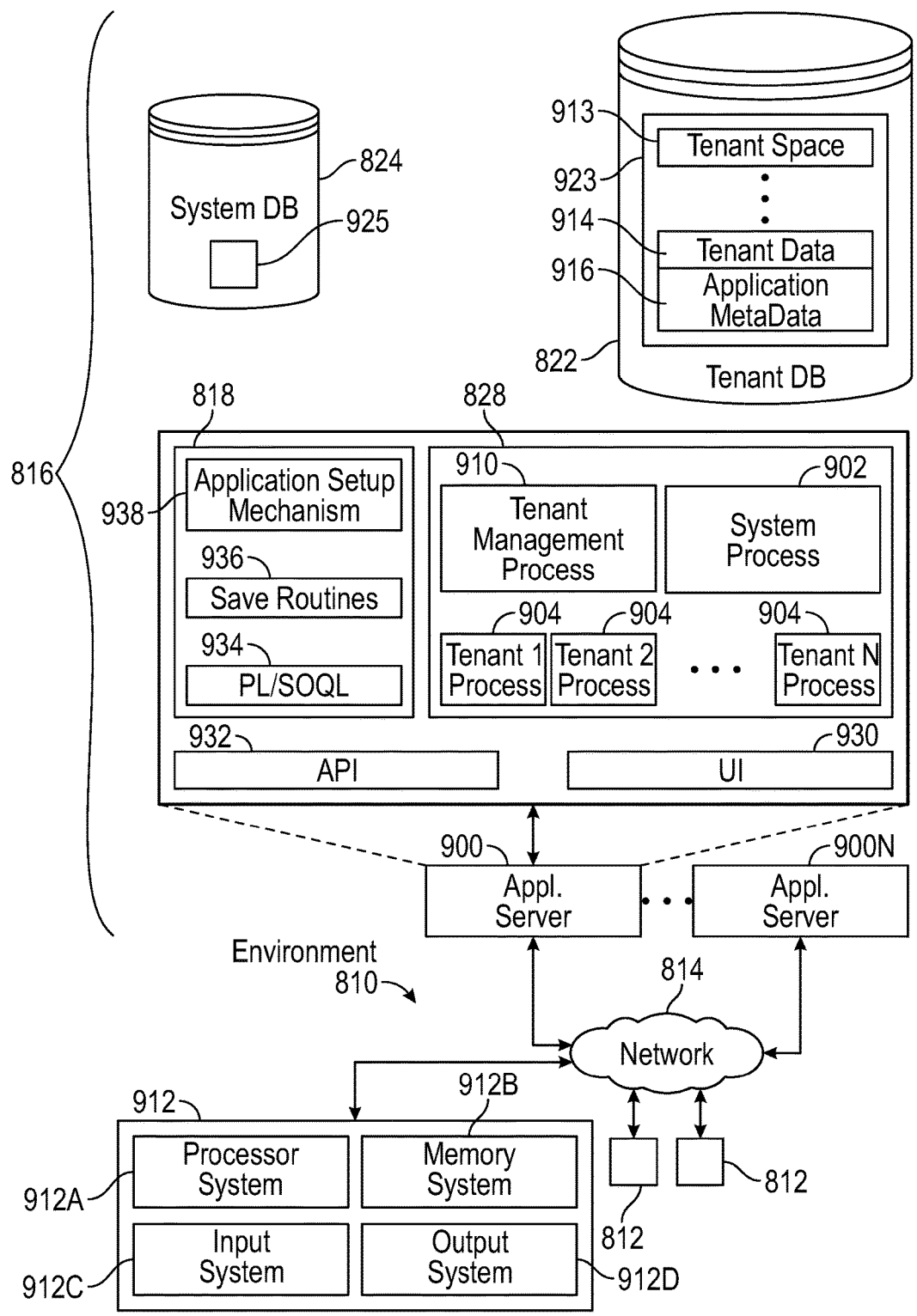
FIG. 9 shows a block diagram of example implementations of elements of FIG. 8 and example interconnections between these elements according to some implementations.

FIG. 9 shows a block diagram of example implementations of elements of FIG. 8 and example interconnections between these elements according to some implementations. That is, FIG. 9 also illustrates environment 810, but FIG. 9, various elements of the system 816 and various interconnections between such elements are shown with more specificity according to some more specific implementations. Elements from FIG. 8 that are also shown in FIG. 9 will use the same reference numbers in FIG. 9 as were used in FIG. 8. Additionally, in FIG. 9, the user system 812 includes a processor system 912A, a memory system 912B, an input system 912C, and an output system 912D. The processor system 912A can include any suitable combination of one or more processors. The memory system 912B can include any suitable combination of one or more memory devices. The input system 912C can include any suitable combination of input devices, such as one or more touchscreen interfaces, keyboards, mice, trackballs, scanners, cameras, or interfaces to networks. The output system 912D can include any suitable combination of output devices, such as one or more display devices, printers, or interfaces to networks.

In FIG. 9, the network interface 820 of FIG. 8 is implemented as a set of HTTP application servers $900_1$-$1400_N$. Each application server 900, also referred to herein as an "app server," is configured to communicate with tenant database 822 and the tenant data 923 therein, as well as system database 824 and the system data 925 therein, to serve requests received from the user systems 912. The tenant data 923 can be divided into individual tenant storage spaces 913, which can be physically or logically arranged or divided. Within each tenant storage space 913, tenant data 914 and application metadata 916 can similarly be allocated for each user. For example, a copy of a user's most recently used (MRU) items can be stored to user storage 914. Similarly, a copy of MRU items for an entire organization that is a tenant can be stored to tenant storage space 913.

The process space 828 includes system process space 902, individual tenant process spaces 904 and a tenant management process space 910. The application platform 818 includes an application setup mechanism 938 that supports application developers' creation and management of applications. Such applications and others can be saved as metadata into tenant database 822 by save routines 936 for execution by subscribers as one or more tenant process spaces 904 managed by tenant management process 910, for example. Invocations to such applications can be coded using PL/SOQL 934, which provides a programming language style interface extension to API 932. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 816 for the subscriber making the invocation and executing the metadata as an application in a virtual machine.

The system 816 of FIG. 9 also includes a user interface (UI) 930 and an application programming interface (API) 932 to system 816 resident processes to users or developers at user systems 912. In some other implementations, the environment 810 may not have the same elements as those listed above or may have other elements instead of, or in addition to, those listed above.

Each application server 900 can be communicably coupled with tenant database 822 and system database 824, for example, having access to tenant data 923 and system data 925, respectively, via a different network connection. For example, one application server $900_1$ can be coupled via the network 814 (for example, the Internet), another application server $900_N$ can be coupled via a direct network link, and another application server (not illustrated) can be coupled by yet a different network connection. Transfer Control Protocol and Internet Protocol (TCP/IP) are examples of typical protocols that can be used for communicating between application servers 900 and the system 816. However, it will be apparent to one skilled in the art that other transport protocols can be used to optimize the system 816 depending on the network interconnections used.

In some implementations, each application server 900 is configured to handle requests for any user associated with any organization that is a tenant of the system 816. Because it can be desirable to be able to add and remove application servers 900 from the server pool at any time and for various reasons, in some implementations there is no server affinity for a user or organization to a specific application server 900. In some such implementations, an interface system implementing a load balancing function (for example, an F5 Big-IP load balancer) is communicably coupled between the application servers 900 and the user systems 912 to distribute requests to the application servers 900. In one implementation, the load balancer uses a least-connections algorithm to route user requests to the application servers 900. Other examples of load balancing algorithms, such as round robin and observed-response-time, also can be used. For example, in some instances, three consecutive requests from the same user could hit three different application servers 900, and three requests from different users could hit the same application server 900. In this manner, by way of example, system 816 can be a multi-tenant system in which system 816 handles storage of, and access to, different objects, data and applications across disparate users and organizations.

In one example storage use case, one tenant can be a company that employs a sales force where each salesperson uses system 816 to manage aspects of their sales. A user can maintain contact data, leads data, customer follow-up data, performance data, goals and progress data, etc., all applicable to that user's personal sales process (for example, in tenant database 822). In an example of a MTS arrangement, because all of the data and the applications to access, view, modify, report, transmit, calculate, etc., can be maintained and accessed by a user system 912 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 816 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 816 also can maintain system level data usable by multiple tenants or other data. Such system level data can include industry reports, news, postings, and the like that are sharable among tenants.

In some implementations, the user systems 912 (which also can be client systems) communicate with the application servers 900 to request and update system-level and tenant-level data from the system 816. Such requests and updates can involve sending one or more queries to tenant database 822 or system database 824. The system 816 (for example, an application server 900 in the system 816) can automatically generate one or more SQL statements (for example, one or more SQL queries) designed to access the desired information. System database 824 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 10A:
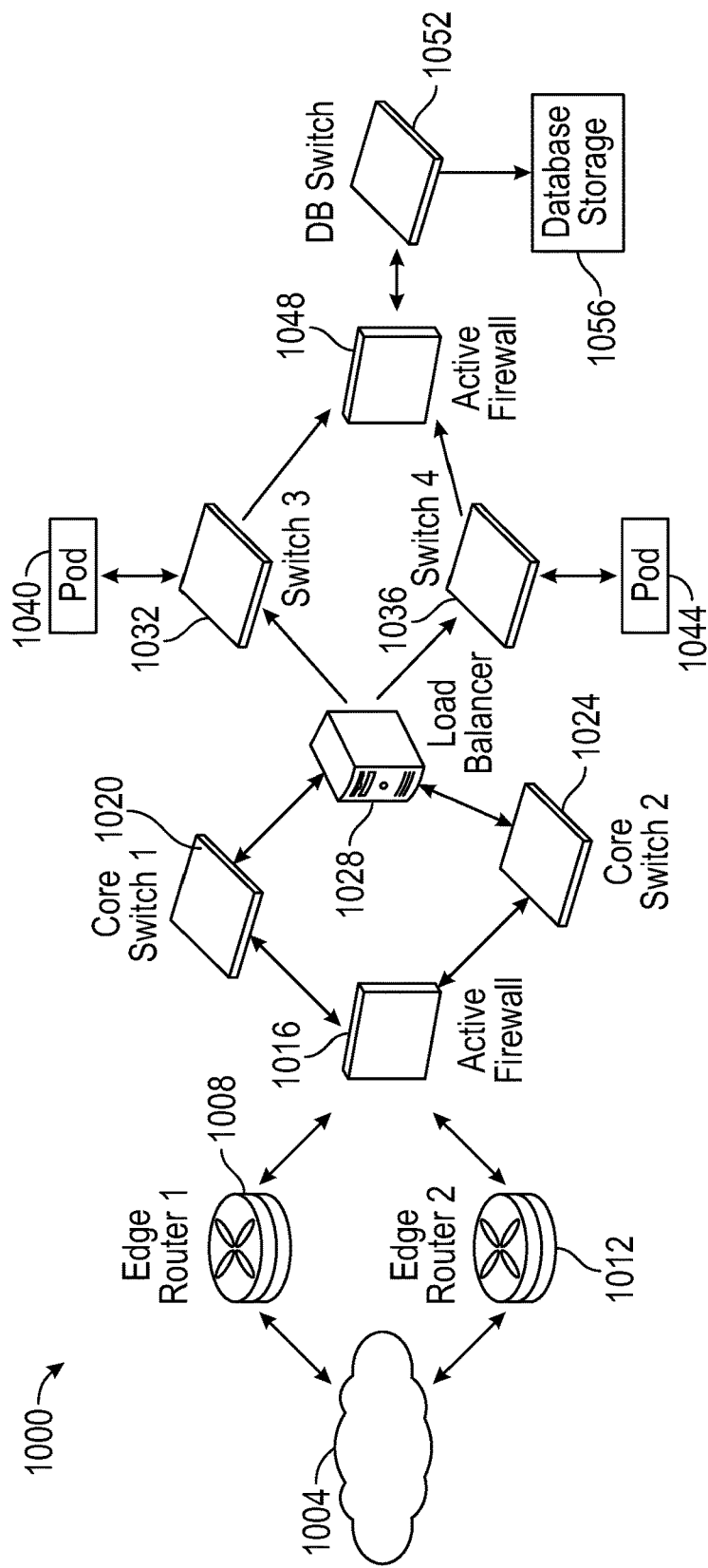
FIG. 10A shows a system diagram illustrating example architectural components of an on-demand database service environment according to some implementations.

FIG. 10A shows a system diagram illustrating example architectural components of an on-demand database service environment 1000 according to some implementations. A client machine communicably connected with the cloud 1004, generally referring to one or more networks in combination, as described herein, can communicate with the on-demand database service environment 1000 via one or more edge routers 1008 and 1012. A client machine can be any of the examples of user systems 12 described above. The edge routers can communicate with one or more core switches 1020 and 1024 through a firewall 1016. The core switches can communicate with a load balancer 1028, which can distribute server load over different pods, such as the pods 1040 and 1044. The pods 1040 and 1044, which can each include one or more servers or other computing resources, can perform data processing and other operations used to provide on-demand services. Communication with the pods can be conducted via pod switches 1032 and 1036. Components of the on-demand database service environment can communicate with database storage 1056 through a database firewall 1048 and a database switch 1052.

Figure 10B:
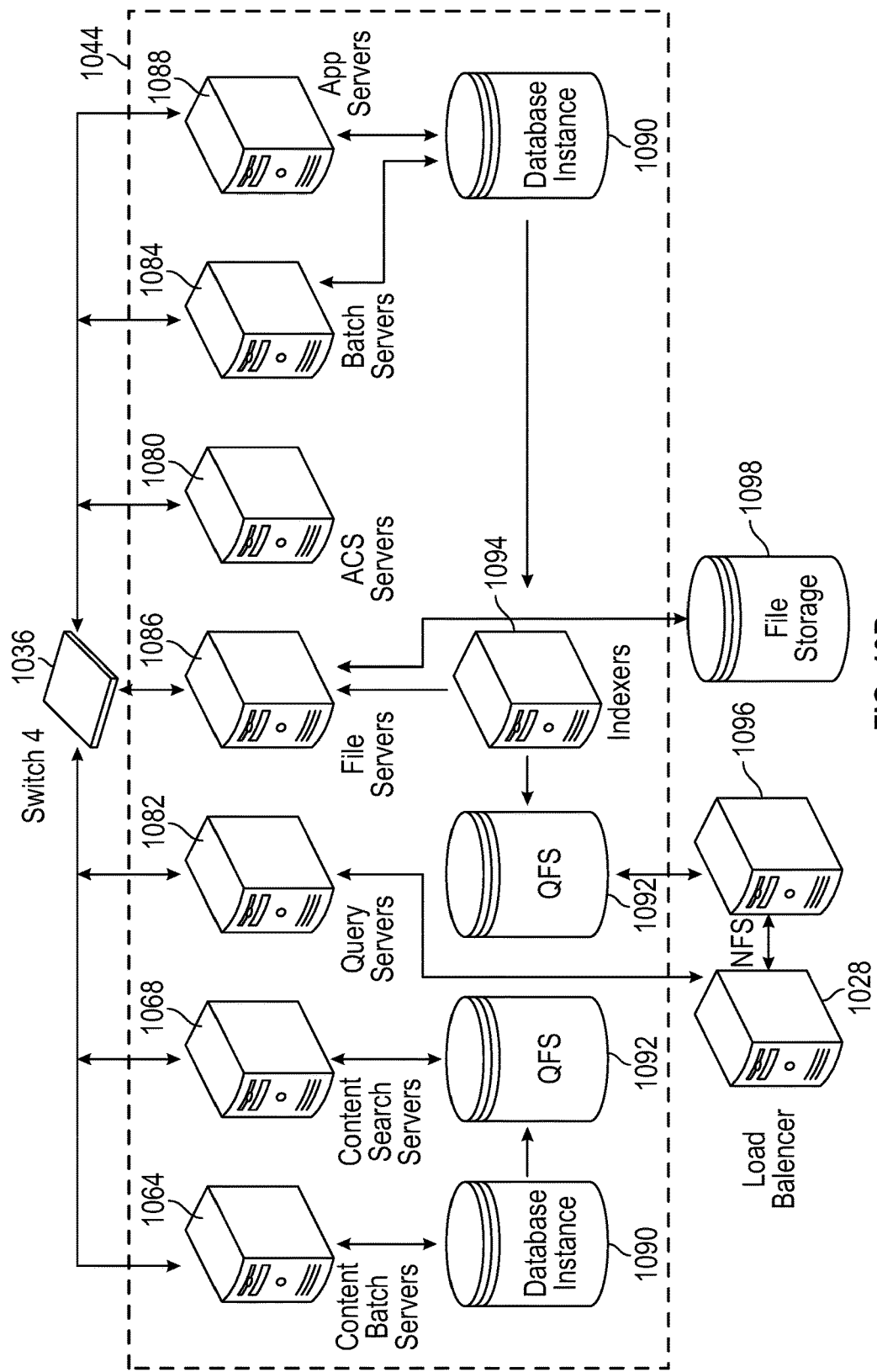
FIG. 10B shows a system diagram further illustrating example architectural components of an on-demand database service environment according to some implementations.

As shown in FIGS. 10A and 10B, accessing an on-demand database service environment can involve communications transmitted among a variety of different hardware or software components. Further, the on-demand database service environment 1000 is a simplified representation of an actual on-demand database service environment. For example, while only one or two devices of each type are shown in FIGS. 10A and 10B, some implementations of an on-demand database service environment can include anywhere from one to several devices of each type. Also, the on-demand database service environment need not include each device shown in FIGS. 10A and 10B, or can include additional devices not shown in FIGS. 10A and 10B.

Additionally, it should be appreciated that one or more of the devices in the on-demand database service environment 1000 can be implemented on the same physical device or on different hardware. Some devices can be implemented using hardware or a combination of hardware and software. Thus, terms such as "data processing apparatus," "machine," "server" and "device" as used herein are not limited to a single hardware device, rather references to these terms can include any suitable combination of hardware and software configured to provide the described functionality.

The cloud 1004 is intended to refer to a data network or multiple data networks, often including the Internet. Client machines communicably connected with the cloud 1004 can communicate with other components of the on-demand database service environment 1000 to access services provided by the on-demand database service environment. For example, client machines can access the on-demand database service environment to retrieve, store, edit, or process information. In some implementations, the edge routers 1008 and 1012 route packets between the cloud 1004 and other components of the on-demand database service environment 1000. For example, the edge routers 1008 and 1012 can employ the Border Gateway Protocol (BGP). The BGP is the core routing protocol of the Internet. The edge routers 1008 and 1012 can maintain a table of IP networks or 'prefixes', which designate network reachability among autonomous systems on the Internet.

In some implementations, the firewall 1016 can protect the inner components of the on-demand database service environment 1000 from Internet traffic. The firewall 1016 can block, permit, or deny access to the inner components of the on-demand database service environment 1000 based upon a set of rules and other criteria. The firewall 1016 can act as one or more of a packet filter, an application gateway, a stateful filter, a proxy server, or any other type of firewall.

In some implementations, the core switches 1020 and 1024 are high-capacity switches that transfer packets within the on-demand database service environment 1000. The core switches 1020 and 1024 can be configured as network bridges that quickly route data between different components within the on-demand database service environment. In some implementations, the use of two or more core switches 1020 and 1024 can provide redundancy or reduced latency.

In some implementations, the pods 1040 and 1044 perform the core data processing and service functions provided by the on-demand database service environment. Each pod can include various types of hardware or software computing resources. An example of the pod architecture is discussed in greater detail with reference to FIG. 10B. In some implementations, communication between the pods 1040 and 1044 is conducted via the pod switches 1032 and 1036. The pod switches 1032 and 1036 can facilitate communication between the pods 1040 and 1044 and client machines communicably connected with the cloud 1004, for example via core switches 1020 and 1024. Also, the pod switches 1032 and 1036 may facilitate communication between the pods 1040 and 1044 and the database storage 1056. In some implementations, the load balancer 1028 can distribute workload between the pods 1040 and 1044. Balancing the on-demand service requests between the pods can assist in improving the use of resources, increasing throughput, reducing response times, or reducing overhead. The load balancer 1028 may include multilayer switches to analyze and forward traffic.

In some implementations, access to the database storage 1056 is guarded by a database firewall 1048. The database firewall 1048 can act as a computer application firewall operating at the database application layer of a protocol stack. The database firewall 1048 can protect the database storage 1056 from application attacks such as structure query language (SQL) injection, database rootkits, and unauthorized information disclosure. In some implementations, the database firewall 1048 includes a host using one or more forms of reverse proxy services to proxy traffic before passing it to a gateway router. The database firewall 1048 can inspect the contents of database traffic and block certain content or database requests. The database firewall 1048 can work on the SQL application level atop the TCP/IP stack, managing applications' connection to the database or SQL management interfaces as well as intercepting and enforcing packets traveling to or from a database network or application interface.

In some implementations, communication with the database storage 1056 is conducted via the database switch 1052. The multi-tenant database storage 1056 can include more than one hardware or software components for handling database queries. Accordingly, the database switch 1052 can direct database queries transmitted by other components of the on-demand database service environment (for example, the pods 1040 and 1044) to the correct components within the database storage 1056. In some implementations, the database storage 1056 is an on-demand database system shared by many different organizations as described above with reference to FIG. 8 and FIG. 9.

FIG. 10B shows a system diagram further illustrating example architectural components of an on-demand database service environment according to some implementations. The pod 1044 can be used to render services to a user of the on-demand database service environment 1000. In some implementations, each pod includes a variety of servers or other systems. The pod 1044 includes one or more content batch servers 1064, content search servers 1068, query servers 1082, file force servers 1086, access control system (ACS) servers 1080, batch servers 1084, and app servers 1088. The pod 1044 also can include database instances 1090, quick file systems (QFS) 1092, and indexers 1094. In some implementations, some or all communication between the servers in the pod 1044 can be transmitted via the switch 1036.

In some implementations, the app servers 1088 include a hardware or software framework dedicated to the execution of procedures (for example, programs, routines, scripts) for supporting the construction of applications provided by the on-demand database service environment 1000 via the pod 1044. In some implementations, the hardware or software framework of an app server 1088 is configured to execute operations of the services described herein, including performance of the blocks of various methods or processes described herein. In some alternative implementations, two or more app servers 1088 can be included and cooperate to perform such methods, or one or more other servers described herein can be configured to perform the disclosed methods.

The content batch servers 1064 can handle requests internal to the pod. Some such requests can be long-running or not tied to a particular customer. For example, the content batch servers 1064 can handle requests related to log mining, cleanup work, and maintenance tasks. The content search servers 1068 can provide query and indexer functions. For example, the functions provided by the content search servers 1068 can allow users to search through content stored in the on-demand database service environment. The file force servers 1086 can manage requests for information stored in the File force storage 1098. The File force storage 1098 can store information such as documents, images, and basic large objects (BLOBs). By managing requests for information using the file force servers 1086, the image footprint on the database can be reduced. The query servers 1082 can be used to retrieve information from one or more file storage systems. For example, the query system 1082 can receive requests for information from the app servers 1088 and transmit information queries to the NFS 1096 located outside the pod.

The pod 1044 can share a database instance 1090 configured as a multi-tenant environment in which different organizations share access to the same database. Additionally, services rendered by the pod 1044 may call upon various hardware or software resources. In some implementations, the ACS servers 1080 control access to data, hardware resources, or software resources. In some implementations, the batch servers 1084 process batch jobs, which are used to run tasks at specified times. For example, the batch servers 1084 can transmit instructions to other servers, such as the app servers 1088, to trigger the batch jobs.

In some implementations, the QFS 1092 is an open source file storage system available from Sun Microsystems® of Santa Clara, Calif. The QFS can serve as a rapid-access file storage system for storing and accessing information available within the pod 1044. The QFS 1092 can support some volume management capabilities, allowing many disks to be grouped together into a file storage system. File storage system metadata can be kept on a separate set of disks, which can be useful for streaming applications where long disk seeks cannot be tolerated. Thus, the QFS system can communicate with one or more content search servers 1068 or indexers 1094 to identify, retrieve, move, or update data stored in the network file storage systems 1096 or other storage systems.

In some implementations, one or more query servers 1082 communicate with the NFS 1096 to retrieve or update information stored outside of the pod 1044. The NFS 1096 can allow servers located in the pod 1044 to access information to access files over a network in a manner similar to how local storage is accessed. In some implementations, queries from the query servers 1082 are transmitted to the NFS 1096 via the load balancer 1028, which can distribute resource requests over various resources available in the on-demand database service environment. The NFS 1096 also can communicate with the QFS 1092 to update the information stored on the NFS 1096 or to provide information to the QFS 1092 for use by servers located within the pod 1044.

In some implementations, the pod includes one or more database instances 1090. The database instance 1090 can transmit information to the QFS 1092. When information is transmitted to the QFS, it can be available for use by servers within the pod 1044 without using an additional database call. In some implementations, database information is transmitted to the indexer 1094. Indexer 1094 can provide an index of information available in the database 1090 or QFS 1092. The index information can be provided to file force servers 1086 or the QFS 1092.

Figure 11:
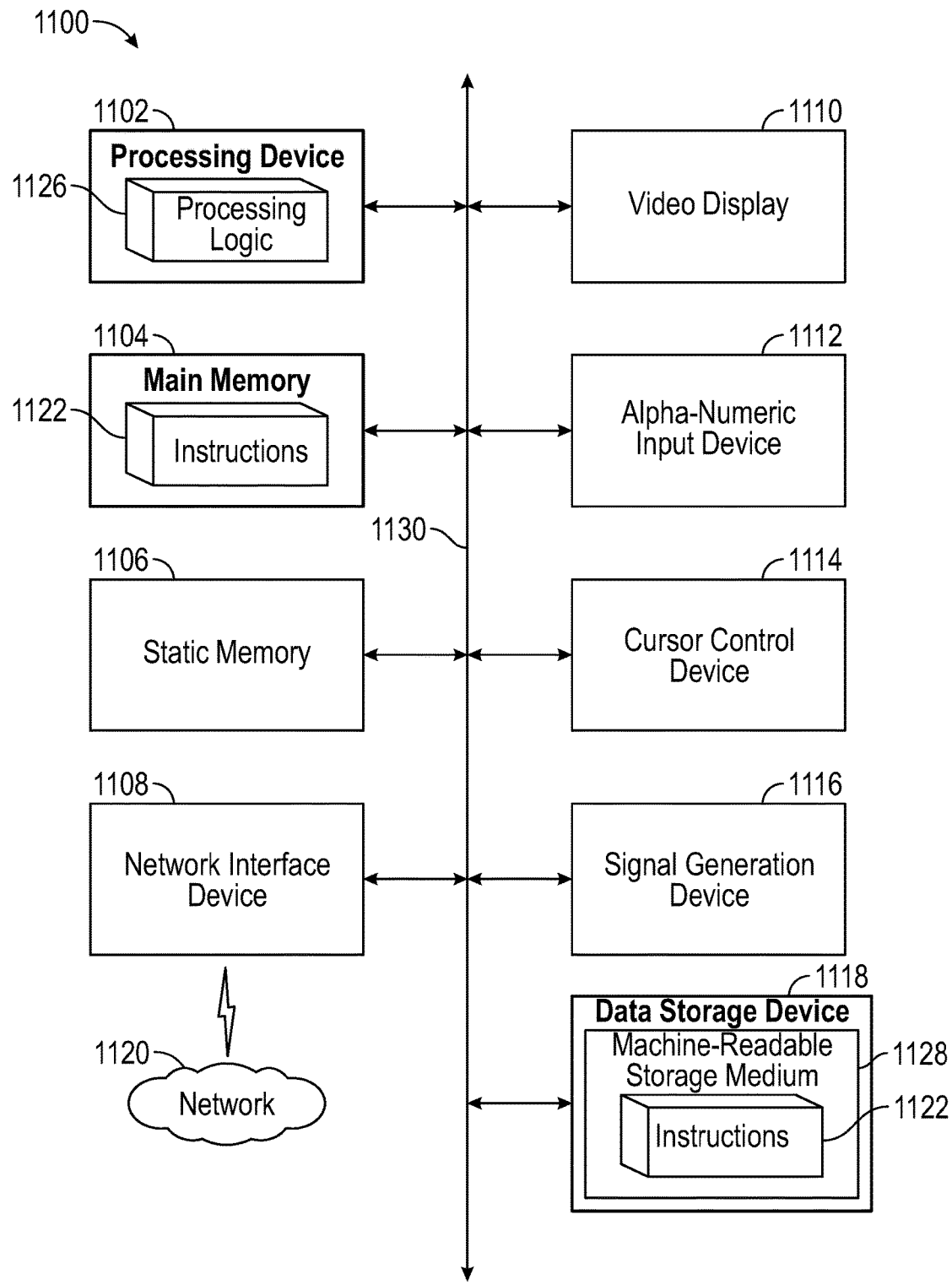
FIG. 11 illustrates a diagrammatic representation of a machine in the exemplary form of a computer system within which a set of instructions, for causing the machine to perform any one or more of the methodologies discussed herein, may be executed.

FIG. 11 illustrates a diagrammatic representation of a machine in the exemplary form of a computer system 1100 within which a set of instructions, for causing the machine to perform any one or more of the methodologies discussed herein, may be executed. The system 1100 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1100 includes a processing device (processor) 1102, a main memory 1104 (e.g., read-only memory (ROM), flash memory, dynamic random access memory (DRAM) such as synchronous DRAM (SDRAM)), a static memory 1106 (e.g., flash memory, static random access memory (SRAM)), and a data storage device 1118, which communicate with each other via a bus 1130.

Processing device 1102 represents one or more general-purpose processing devices such as a microprocessor, central processing unit, or the like. More particularly, the processing device 1102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1102 may also be one or more special-purpose processing devices such as an application specific integrated circuit (ASIC), a field programmable gate array (FPGA), a digital signal processor (DSP), network processor, or the like.

The computer system 1100 may further include a network interface device 1108. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker).

The data storage device 1118 may include a computer-readable medium 1128 on which is stored one or more sets of instructions 1122 (e.g., instructions of in-memory buffer service 114) embodying any one or more of the methodologies or functions described herein. The instructions 1122 may also reside, completely or at least partially, within the main memory 1104 and/or within processing logic 1126 of the processing device 1102 during execution thereof by the computer system 1100, the main memory 1104 and the processing device 1102 also constituting computer-readable media. The instructions may further be transmitted or received over a network 1120 via the network interface device 1108.

While the computer-readable storage medium 1128 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "adding", "selecting" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for re-deploying metadata and data from a source organization of a first tenant of a multi-tenant database system to a destination organization of a second tenant of the multi-tenant database system that is different than the source organization, the method comprising:

selecting, via a user system, metadata that is to be retrieved from the source organization;

automatically creating, via a metadata engine that executes at one or more hardware-based processors, a manifest file that comprises the selected metadata that is to be retrieved from the source organization;

storing the manifest file at a secure file storage where it is securely stored for re-deployment to the destination organization;

automatically retrieving, via a data engine that executes at one or more other hardware-based processors, data associated with the selected metadata, wherein the selected metadata and the data associated with the selected metadata collectively make up an application, wherein the selected metadata comprises: customized content of the source organization; and wherein the data comprises: records held by an object;

re-deploying, in response to an input from the user system, the manifest file of the selected metadata to the destination organization that is different than the source organization; and re-deploying, via a data engine that executes at one or more other hardware-based processors, the data associated with the selected metadata to the destination organization that is different than the source organization, wherein each organization has a unique identifier (ID) that defines a logical space provided to a particular tenant of the multi-tenant database system and represents data of that particular tenant so that data of that particular tenant data is separate from data of all other tenants of the multi-tenant data base system, and wherein redeploying, via the data engine that executes at the one or more other hardware-based processors, the data comprises: automatically reconstructing, at the data engine when the manifest file has been re-deployed, relationships amongst the data that has been successfully migrated to the destination organization and a new identifier that is associated with the data at the destination organization.

2. The method of claim 1, wherein selecting metadata that is to be retrieved from the source organization comprises:
interacting with elements of a graphical user interface to select the metadata to be retrieved from the source organization; and
wherein automatically creating comprises:
interacting with another element of the graphical user interface to cause the metadata engine to automatically create a first file that includes the selected metadata that is to be retrieved from the source organization, and then automatically package the selected metadata into the manifest file.

3. The method of claim 2, wherein the first file is an Extensible Markup Language (XML) file, and wherein the manifest file is a ZIP file whose contents of one or more files are compressed.

4. The method of claim 1, wherein automatically retrieving the data associated with the selected metadata further comprises:
interacting with a graphical user interface element to instruct the data engine to automatically retrieve the data associated with the selected metadata.

5. The method of claim 4, further comprising:
automatically determining, via the data engine, the data from the source organization based on objects specified in the selected meta data; and
automatically saving and storing the data associated with the selected metadata at a secured database for re-deployment to the destination organization.

6. The method of claim 1, wherein re-deploying the manifest file of the selected metadata to the destination organization, comprises:
selecting, via a graphical user interface, the manifest file of the selected metadata;
specifying, via the graphical user interface, the destination organization that the manifest file is to be re-deployed to;
automatically retrieving, via the metadata engine, the manifest file from the secure file storage; and
automatically sending, via the metadata engine, the manifest file to the destination organization.

7. The method of claim 6, wherein re-deploying the data associated with the selected metadata to the destination organization, comprises:
automatically determining, via the data engine, the data associated with objects specified in the selected metadata from the secured database; and
automatically sending, via the data engine, the data associated with the selected metadata to the destination organization.

8. A computing system, comprising:
a source organization of a first tenant of a multi-tenant database system;
a user system configured to select metadata that is to be retrieved from the source organization;
a destination organization of a second tenant of the multi-tenant database system that is different than the source organization; and
a platform for re-deploying selected metadata and data associated with that metadata from the source organization to the destination organization, wherein the selected metadata and the data associated with the selected metadata collectively make up an application, wherein the selected metadata comprises: customized content of the source organization; and wherein the data comprises: records held by an object, the platform comprising:
secure file storage;
a secured database;
a metadata engine that executes at one or more hardware-based processors and being configured to: automatically create, in response to inputs received from the user system that indicate selected metadata that is to be retrieved from the source organization, a manifest file comprising the selected metadata that is to be retrieved from the source organization; store the manifest file at the secure file storage where it is securely stored for re-deployment to the destination organization; and re-deploy the manifest file to the destination organization that is different than the source organization; and
a data engine that executes at one or more other hardware-based processors and being configured to: automatically retrieve data that is associated with the selected metadata from the source organization; store the data at the secured database; and re-deploy the data associated with the selected metadata to the destination organization that is different than the source organization, wherein each organization has a unique identifier (ID) that defines a logical space provided to a particular tenant of the multi-tenant database system and represents data of that particular tenant so that data of that particular tenant data is separate from data of all other tenants of the multi-tenant database system, and
when the manifest file has been re-deployed, wherein the data engine is further configured to automatically reconstruct relationships amongst the data that has been successfully migrated to the destination organization and a new identifier that is associated with the data at the destination organization.

9. The computing system of claim 8, wherein the data engine is configured to: automatically retrieve the data associated with the selected metadata in response to interaction with a graphical user interface element to instruct the data engine to automatically retrieve the data associated with the selected metadata.

10. The computing system of claim 8, wherein the data engine is configured to: automatically determine the data associated with the selected metadata from the source organization based on objects specified in the selected metadata.

11. The computing system of claim 8, wherein the metadata engine is further configured to:
receive inputs from the user system that select the manifest file and specify the destination organization that the manifest file is to be re-deployed to;

automatically retrieve the manifest file from the secure file storage; and automatically send the manifest file to the destination organization to re-deploy the manifest file to the destination organization.

12. The computing system of claim 11, wherein the data engine is configured to:

automatically determine the data associated with objects specified in the selected metadata from the source organization; and automatically send the data associated with the selected metadata to the destination organization.

13. The computing system of claim 8, wherein the inputs received from the user system, that indicate selected metadata that is to be retrieved from the source organization, are generated based on user interaction with elements of a graphical user interface to select the metadata, and wherein the manifest file is automatically created based on user interaction with another element of the graphical user interface to cause the metadata engine to automatically create a first file that includes the selected metadata that is to be retrieved from the source organization, and then automatically package the selected metadata into the manifest file.

14. A computing system comprising one or more hardware-based processors and a memory, wherein the memory comprises computer-executable instructions that are capable of execution by the one or more hardware-based processors, and that when executed by the one or more hardware-based processors, cause the computing system to:

automatically create, via a metadata engine that executes at one or more hardware-based processors in response to a selection of metadata that is to be retrieved from a source organization of a first tenant of a multi-tenant database system, a manifest file that comprises selected metadata that is to be retrieved from the source organization;

store the manifest file at a secure file storage where it is securely stored for re-deployment;

automatically determine data from the source organization based on objects specified in the selected metadata, and store the data at a secured database for re-deployment, wherein the data is associated with the selected metadata, wherein the selected metadata and the data associated with the selected metadata collectively make up an application, wherein the selected metadata comprises: customized content of the source organization; and wherein the data comprises: records held by an object;

re-deploy, in response to input from a user system, the manifest file of the selected metadata to a destination organization of a second tenant of the multi-tenant database system that is different than the source organization; and re-deploy, via a data engine that executes at one or more other hardware-based processors, the data associated with the selected metadata to the destination organization that is different than the source organization, wherein each organization has a unique identifier (ID) that defines a logical space provided to a particular tenant of the multi-tenant database system and represents data of that particular tenant so that data of that particular tenant data is separate from data of all other tenants of the multi-tenant database system, and when the manifest file has been re-deployed, wherein the one or more other hardware-based processors of the data engine are further configured to automatically reconstruct relationships amongst the data that has been successfully migrated to the destination organization and a new identifier that is associated with the data at the destination organization.

* * * * *